United States Patent
Lee et al.

(10) Patent No.: US 12,525,267 B2
(45) Date of Patent: Jan. 13, 2026

(54) DEVICE AND METHOD WITH COMPUTATIONAL MEMORY

(71) Applicant: SAMSUNG ELECTRONICS CO., LTD., Suwon-si (KR)

(72) Inventors: Hyungwoo Lee, Suwon-si (KR); Soon-Wan Kwon, Suwon-si (KR); Seungchul Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 18/108,737

(22) Filed: Feb. 13, 2023

(65) Prior Publication Data

US 2024/0112708 A1 Apr. 4, 2024

(30) Foreign Application Priority Data

Sep. 22, 2022 (KR) .................. 10-2022-0119831

(51) Int. Cl.
| | |
|---|---|
| G06F 7/544 | (2006.01) |
| G11C 7/10 | (2006.01) |
| G11C 7/12 | (2006.01) |
| G11C 11/54 | (2006.01) |

(52) U.S. Cl.
CPC .......... *G11C 7/1084* (2013.01); *G06F 7/5443* (2013.01); *G11C 7/12* (2013.01); *G11C 11/54* (2013.01)

(58) Field of Classification Search
CPC ...... G11C 7/1084; G11C 11/54; G06F 7/5443
See application file for complete search history.

(56) References Cited

U.S. PATENT DOCUMENTS

| | | | |
|---|---|---|---|
| 11,114,139 B2 | 9/2021 | Shin et al. | |
| 2018/0232627 A1* | 8/2018 | Rozen | G06N 3/063 |
| 2019/0164038 A1* | 5/2019 | Zhang | G06N 3/04 |
| 2021/0118864 A1 | 4/2021 | Delacruz et al. | |
| 2021/0232892 A1 | 7/2021 | Zhang | |
| 2022/0019884 A1 | 1/2022 | Jung et al. | |

(Continued)

OTHER PUBLICATIONS

Lee et al. "A 1.2V 64Gb 8-Channel 256GB/s HBM DRAM with Peripheral-Base-Die Architecture and Small-Swing Technique on Heavy Load Interface" *2016 IEEE International Solid-State Circuits Conference (ISSCC). IEEE*, Feb. 3, 2016. (pp. 1-3).

(Continued)

*Primary Examiner* — Min Huang
(74) *Attorney, Agent, or Firm* — NSIP Law

(57) ABSTRACT

A computational memory device and a method using the computational memory device are provided. The computational memory device includes memory banks configured to store weight data of a neural network model and a weight memory block configured to provide at least some of the weight data from memory banks in response to a weight request, a computational memory block physically stacked on the weight memory block such faces of the respective blocks face each other, the computational memory block configured to perform a multiply-accumulate (MAC) operation between the at least some of the weight data and at least some of input data by using a bit cell array including bit cells, and a communication interface configured to perform communication between the weight memory block and the computational memory block.

20 Claims, 15 Drawing Sheets

(56) References Cited

U.S. PATENT DOCUMENTS

2022/0028444 A1* 1/2022 Papageorgiou .......... G06N 3/08
2022/0075601 A1* 3/2022 Lin ....................... G06F 7/5443
2022/0262953 A1* 8/2022 Kozuma ................ H03K 3/356

OTHER PUBLICATIONS

Cho et al. "A 1.2V 64Gb 341GB/s HBM2 Stacked DRAM with Spiral Point-to-Point TSV Structure and Improved Bank Group Data Control" *2018 IEEE International Solid-State Circuits Conference-(ISSCC). IEEE*, Feb. 13, 2018. (pp. 1-3).
Kim et al. "Signal Integrity Design and Analysis of a Spiral Through-Silicon Via (TSV) Array Channel for High Bandwidth Memory (HBM)" *2021 IEEE Electrical Design of Advanced Packaging and Systems (EDAPS). IEEE*, 2021. (pp. 1-3).
Jung et al. "A crossbar array of magnetoresistive memory devices for in-memory computing" *Nature* vol. 601 Number 7892, Jan. 13, 2022 (pp. 211-227).

* cited by examiner

DEVICE AND METHOD WITH COMPUTATIONAL MEMORY

CROSS-REFERENCE TO RELATED APPLICATIONS

This application claims the benefit under 35 USC § 119(a) of Korean Patent Application No. 10-2022-0119831, filed on Sep. 22, 2022, in the Korean Intellectual Property Office, the entire disclosure of which is incorporated herein by reference for all purposes.

BACKGROUND

1. Field

The following description relates to a device and method with computational memory.

2. Description of Related Art

A vector matrix multiplication operation, also known as a multiply-accumulate (MAC) operation, may affect the performance of an application in various fields. For example, the MAC operation may be performed for machine learning and authentication of a neural network including multiple layers, among others. An input signal may form an input vector and may be data of images, byte streams, or other datasets. An input signal may be multiplied by a weight, and an output vector may be obtained from a result of accumulated MAC operations. The output vector may be provided as an input vector for a subsequent layer, in the case of a neural network. Such a MAC operation is often iterated for many layers, and neural network processing performance may mainly depend on the performance of the MAC operation. A MAC operation may be implemented through in-memory computing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To process a first layer of the neural network model, the computational memory block may be configured to: receive first input data of the first layer from a data memory and store the first input data of the first layer in the bit cell array, transmit, to the weight memory block, a first weight request indicating first weight data, the weight data forming, with the first input data, an operation pair for the MAC operation, and receive the first weight data from the weight memory block and perform a first MAC operation between the first input data and the first weight data, wherein an operation result of the first MAC operation corresponds to at least a portion of first output feature data generated by the first layer.

The weight data may include a multi-bit data format, and the computational memory block is configured to sequentially receive, bit by bit, a bitstream corresponding to at least some of the weight data and perform a bitwise MAC operation.

The communication interface may include a parallel-to-serial converter configured to convert an expression format of weights in the weight data from a parallel expression to a serial expression.

To process a first layer of the neural network model, the computational memory block may be configured to transmit, to the weight memory block, a first weight request indicating first weight data of the first layer, receive the first weight data from the weight memory block and store the first weight data in the bit cell array, and receive, from an additional memory, first input data forming an operation pair with the first weight data for the MAC operation and perform a first MAC operation between the first input data and the first weight data, wherein an operation result of the first MAC operation corresponds to at least some of first output feature data of the first layer.

The first input data may include a multi-bit data format, and the computational memory block is configured to sequentially receive, bit by bit, a bitstream corresponding to the first input data and perform a bitwise first MAC operation.

The communication interface may include a first channel and a second channel, and after first weight data of the weight memory block is stored in a first data buffer of the first channel through the first channel, while the first weight data may be transmitted to the computational memory block from the first data buffer, second weight data of the weight memory block may be stored in a second data buffer of the second channel through the second channel.

The weight request may include a memory address of at least some of the weight data.

The computational memory block may include a first access controller configured to transmit the weight request to the weight memory block, and the weight memory block may include a second access controller configured to receive the weight request from the first access controller and access at least some of memory banks corresponding to the memory address of the weight request.

The weight memory block may include bank groups of memory banks and an address decoder of bank groups.

Each memory bank of memory banks may include sub-memory banks having respective sub-address decoders.

The communication interface may include a through silicon via (TSV) connecting the weight memory block to the computational memory block in direction perpendicular to the faces of the weight memory block and computational memory block, respectively.

Memory banks may include non-volatile memory and the bit cell array may include volatile memory.

The non-volatile memory may include magnetic random-access memory (MRAM) and the volatile memory may include static random-access memory (SRAM).

The computational memory block may include the bit cell array comprising bit cells configured to perform multiplication operations of bit pairs, based on at least some of the weight data and at least some of input data; an adder configured to perform addition operations based on multiplication results of the multiplication operations; and an accumulator configured to perform an accumulate operation based on an addition result of the addition operations, wherein an accumulation result of the accumulate operation corresponds to a MAC operation result of the MAC operation.

In one general aspect, a computational memory device includes memory banks configured to store weight data of a neural network model and a weight memory block configured to provide at least some of the weight data from memory banks in response to a weight request; a computational memory block physically stacked on the weight memory block such that faces of the respective blocks face each other, the computational memory block configured to perform a multiply-accumulate (MAC) operation between the at least some of the weight data and at least some of input data by using a bit cell array including bit cells; and a communication interface configured to perform communication between the weight memory block and the computational memory block.

In another general aspect, a MAC operation method of a computational memory block stacked on a weight memory block in a perpendicular direction includes transmitting a weight request indicating at least some of weight data of a neural network model stored in memory banks of the weight memory block to the weight memory block through a communication interface for communication between the weight memory block and the computational memory block; receiving at least some of the weight data based on the weight request from the weight memory block through the communication interface; and performing a MAC operation between at least some of the weight data and at least some of input data by using bit cells of a bit cell array of the computational memory block.

Other features and aspects will be apparent from the following detailed description, the drawings, and the claims.

Figure 1:
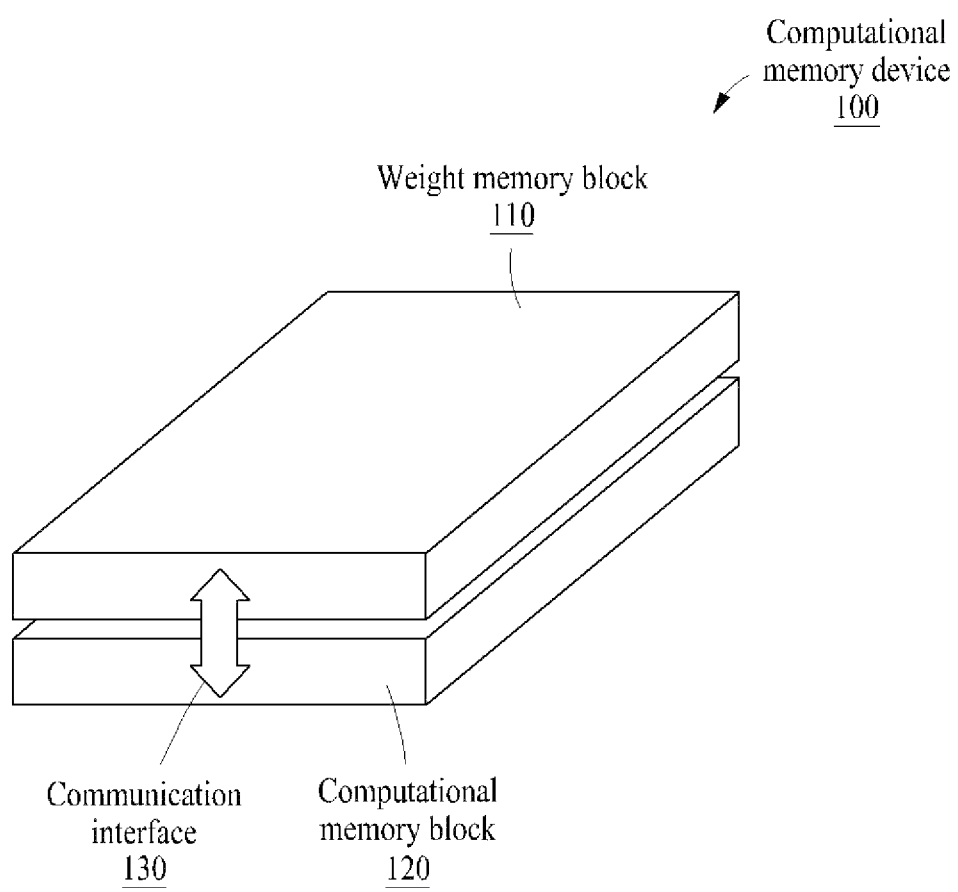
FIG. 1 illustrates an example of a stacking structure of a computational memory device, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of a stacking structure of a computational memory device, according to one or more embodiments. Referring to FIG. 1, a computational memory device 100 may include a weight memory block 110, a computational memory block 120, and a communication interface 130. The weight memory block 110 may store weight data of a neural network model. The communication interface 130 may provide the stored weight data to the computational memory block 120. The computational memory block 120 may perform a multiply-accumulate (MAC) operation based on the provided weight data.

The computational memory block 120 may perform a function of storing data as a memory device and perform a function, as a computational device, of deriving an operation result based on the stored data in the computational memory block 120. The computational memory block 120 may perform a MAC operation through in-memory computing (IMC). An IMC device is generally a type of device that has a memory element with a structural feature that derives an operation result between (i) data stored in the memory element and (i) an input (e.g., a control signal) to the memory element by using the structural feature or operation method of the memory element. As described further below, in some cases the data stored in the memory element may be weight data (e.g., weight-stationary), and in some cases the data stored in the element may be input data (e.g., input-stationary, and the input data to be distinguished from the input/control signal).

In a Von Neumann architecture device, there is a limitation in performance and power because of frequent data movement between a computational device and a memory device. In this case, the computational device may correspond to a processor and the memory device may correspond to a large-capacity storage device, such as a disk storage device (e.g., a hard disk drive (HDD)), a flash memory, and dynamic random-access memory (DRAM). As noted, and IMC device is a computer architecture for directly performing an operation in memory where data is stored, which, compared to a Von Neumann device performing the same operation, generally requires less data movement between a computational device and a memory device and increases power efficiency. Between weight data and input feature data, when one is stored in the computational memory block 120, the other may be input to the computational memory block 120, and an operation result may be output from the computational memory block 120. The input feature data is also referred to as input data ("input data" may refer to a type of data, namely, data being applied to the weight data, regardless of which is stationary). Accordingly, data transmission may be minimized during an operation process.

The computational memory device 100 may perform a MAC operation. The MAC operation may occupy a significant portion of operations for implementing an artificial intelligence (AI) algorithm, e.g., for learning/training or for inferencing. For example, a significant portion of processing layers of a neural network model may be performed through a MAC operation. In a neural network model, processing a given layer may include a MAC operation of summing results obtained by multiplying input values of input nodes of the given layer by a weight. The MAC operation may be expressed as in Equation 1 below.

$$O_0 = \sum_{m=0}^{M-1} I_m W_{0,m} O_1 = \sum_{m=0}^{M-1} I_m W_{1,m}, \ldots, O_{T-1} = \sum_{m=0}^{M-1} I_m W_{T-1,m} \quad \text{Equation 1}$$

In Equation 1, $O_t$ denotes an output to a t-th node, $I_m$ denotes an m-th input, and $W_{t,m}$ denotes a weight applied to the m-th input that is input to the t-th node. $O_t$ may be an output of a node or a node value and may be calculated as a weighted sum of an input $I_m$ and a weight $W_{t,m}$. In this case, m may be an integer greater than or equal to 0 and less than or equal to M−1, t may be an integer greater than or equal to 0 and less than or equal to T−1, and M and T may be an integer. M may be the number of nodes of a previous layer connected to a node of a current layer, which is to be a target of an operation, and T may be the number of nodes of the current layer.

IMC devices may be classified into analog IMC devices and digital IMC devices (or, in some cases, hybrids thereof). An analog IMC device may perform a MAC operation in an analog domain including a current, an electric charge, or a time domain. A digital IMC device may perform a MAC operation by using a logic circuit. Digital IMC devices may be easily implemented through advanced processing and may exhibit excellent performance. In some embodiments, the computational memory block 120 may be constructed as a digital IMC device. For example, the computational memory block 120 may include static random-access memory (SRAM) including transistors (e.g., six transistors). SRAM including six transistors may be referred to as 6T-SRAM. SRAM may store data as a logic value 0 or 1 and may not require domain conversion.

In some embodiments, the weight memory block 110 may include non-volatile memory. For example, the weight memory block 110 may include magnetic random-access memory (MRAM), which, as explained next, may be suitable for storing weight data. Generally, weight data may be stationary after the training of a neural network model is completed. Although input data of the neural network model may change for respective different inference operations, the weight data may be fixed during the inference operations. Accordingly, if the weight data is stored in non-volatile memory, the weight data may be maintained even when power is not supplied to the non-volatile memory and the weight data may be continuously used by supplying power when performing an inference operation. This may allow a device encompassing the computation memory device 100, e.g., a camera, a vehicle, or the like to store a neural network model (weight data and possibly other related data) that is pre-configured or pre-trained for a particular task. Even when the encompassing device loses power, the pre-trained neural network model is available for use when encompassing device resumes operation.

In some embodiments, the weight memory block 110 may include primarily non-volatile memory and the computational memory block 120 may include primarily volatile memory. For example, the weight memory block 110 may include MRAM and the computational memory block 120 may include SRAM. In an example, the weight memory block 110 may include volatile memory and the computational memory block 120 may include non-volatile memory. For example, the weight memory block 110 may include SRAM and the computational memory block 120 may include MRAM.

When providing AI technology using a neural network model through a large-scale virtual service or cloud/network service, such as by a data center, an inference operation of the neural network model may constitute a significant portion of the resources needed to implement the virtual service. In addition, recently, the sizes of neural network models have been gradually increasing. The weight memory block 110 may store a significant portion (e.g., a whole model or at least one layer) of weight data of a neural network model and, for an inference operation, may transmit weight data as needed to the computational memory block 120. Accordingly, exchanges between a computational device and a memory device may be reduced.

The weight memory block 110 and the computational memory block 120 may have a stacking structure with respect to each other. The computational memory block 120 may be stacked on the weight memory block 110 in a perpendicular direction (perpendicular to the planes of the relevant chips/circuits). Note that "stacked on" refers to an arbitrary "up" direction; in practice, either block may be on "top" of the other, so long as opposing faces of the blocks are adjacent (with some barrier, layer, e.g., non-conductive file, between them). Although FIG. 1 illustrates an example of the weight memory block 110 stacked on the computational memory block 120, the computational memory block 120 may be stacked on the weight memory block 110. The communication interface 130 may provide a communication environment, such as a through silicon via (TSV), suitable for a stacking structure. A TSV may connect the weight memory block 110 to the computational memory block 120 in a perpendicular direction (i.e., between facing planar surfaces of the memory block 110 and the computational memory block 120).

An area (footprint) occupied by the overall computational memory device 100 may be reduced through the stacking structure as illustrated in FIG. 1, as compared to the area of a comparable non-stacking device. The communication interface 130 is not limited to a TSV interface, for example, a hard wire, a system in package (SIP), or other suitable interface may be used. In addition, the weight memory block 110 and the computational memory block 120 may be configured by horizontally connecting sequentially arranged dies on a same wafer.

Figure 2:
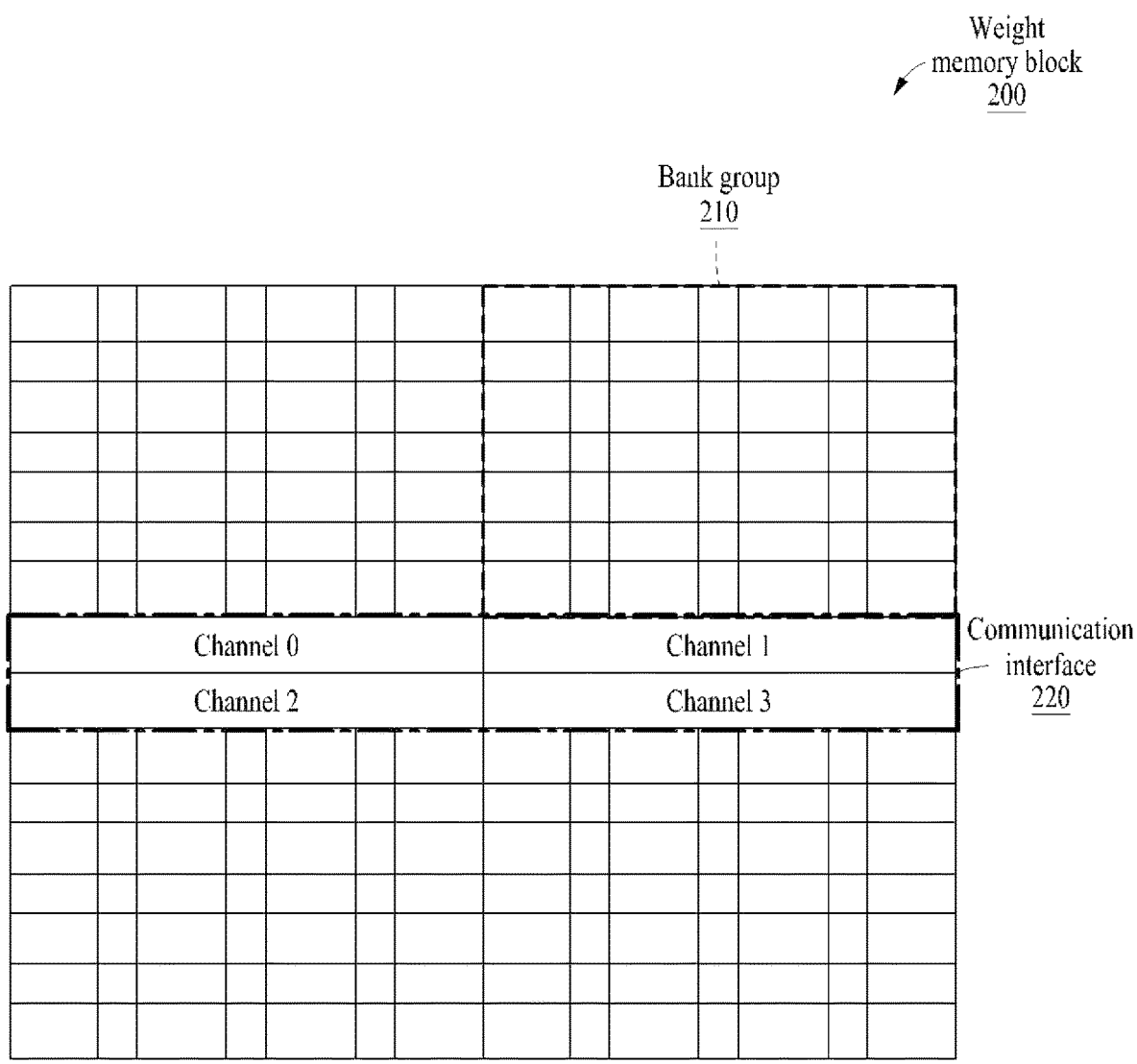
FIG. 2 illustrates an example of an inner structure of a weight memory block, according to one or more embodiments.

FIG. 2 illustrates an example of an inner structure of a weight memory block, according to one or more embodiments. For example, the weight memory block 200 may be an implementation of the weight memory block 110. Referring to FIG. 2, the weight memory block 200 may include bank groups, such as a bank group 210, and a communication interface 220 for the bank groups. Each bank group may include memory banks. Channels (e.g., channel 1, 2, 3, and 4) of the communication interface 220 may be used for communication of corresponding bank groups. The number of bank groups is not limited to four.

Figure 3:
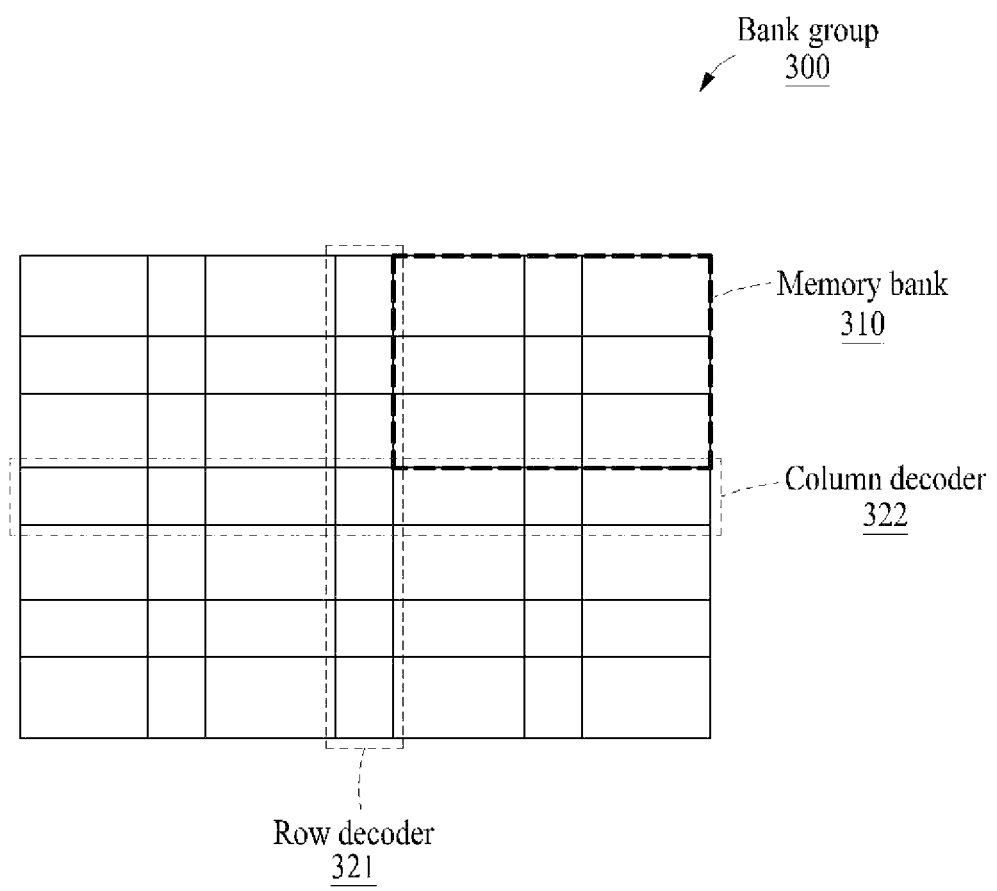
FIG. 3 illustrates an example of an inner structure of a bank group of a weight memory block, according to one or more embodiments.

FIG. 3 illustrates an example of an inner structure of a bank group of a weight memory block, according to one or more embodiments. For example, the bank group 300 shown in FIG. 3 may be an implementation of the bank group 210. As will be explained with reference to FIGS. 3 and 4, memory device such as the weight memory block 200 may have a hierarchical structure, with decoders at a given level for addressing units of memory at the given level, and with those units having their own sub-units of memory, where the sub-units have their own sub-decoders for addressing the sub-units. There may be two or more levels in such a hierarchy.

Referring to FIG. 3, the bank group 300 may include memory banks, such as a memory bank 310, a row decoder 321, and a column decoder 322. The row decoder 321 and/or the column decoder 322 may together form an address decoder (for cross-bar style address decoding). The bank group 300 may further include a controller and/or a bias circuit. The row decoder 321 and/or the column decoder 322 may be used to access a memory bank of a certain address. The number of memory banks of a bank group is not limited to four.

Figure 4:
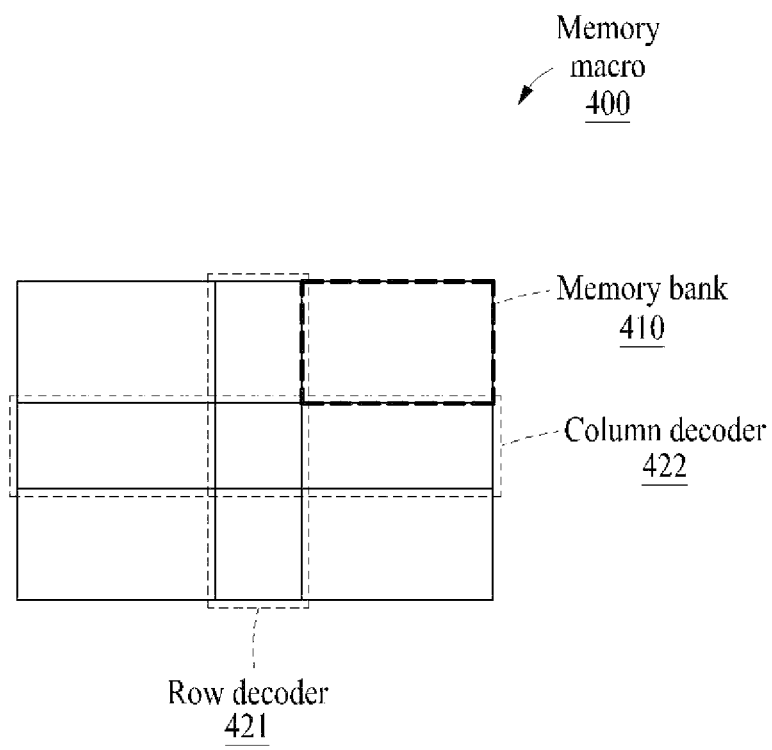
FIG. 4 illustrates an example of an inner structure of a memory macro, according to one or more embodiments.

FIG. 4 illustrates an example of an inner structure of a memory macro, according to one or more embodiments. The memory macro 400 shown in FIG. 4 may be used as the memory bank 310 of 1 MB in FIG. 3. Referring to FIG. 4, the memory macro 400 may include memory banks, such as a memory bank 410, a row decoder 421, and a column decoder 422. The memory bank 410 may have less storage capacity than that of the memory bank 310 of FIG. 3. For example, each memory bank 410 may be 0.25 megabytes (MB), and four memory banks 410 may collectively form a major portion of the memory macro 400 of 1 MB. The memory bank 410 may also be referred to as a sub-memory bank, as compared to a large memory bank such as the memory bank 310. Similarly, an address decoder of a sub-memory bank may be referred to as a sub-address decoder.

The memory macro 400 may further include a controller and/or a bias circuit. The row decoder 421 and/or the column decoder 422 may be used to direct access to a memory bank of a certain address. The number of memory banks (sub-memory banks) is not limited to four.

Various types of memory may be used as the memory bank 410. In some embodiments, the memory bank 410 may be/include non-volatile memory. For example, the memory bank 410 may include MRAM. In the examples of FIGS. 2, 3, and 4, when the size of the memory bank 410 is 0.25 MB (other sizes may be used), the size of the memory macro 400 may be 1 MB, the size of the bank group 300 may be 4 MB, and the size of the weight memory block 200 may be 16 MB. The sizes thereof may be used to store a whole large-capacity model or at least one layer of a model (unless indicated otherwise, "model" herein refers to a neural network model).

Figure 5:
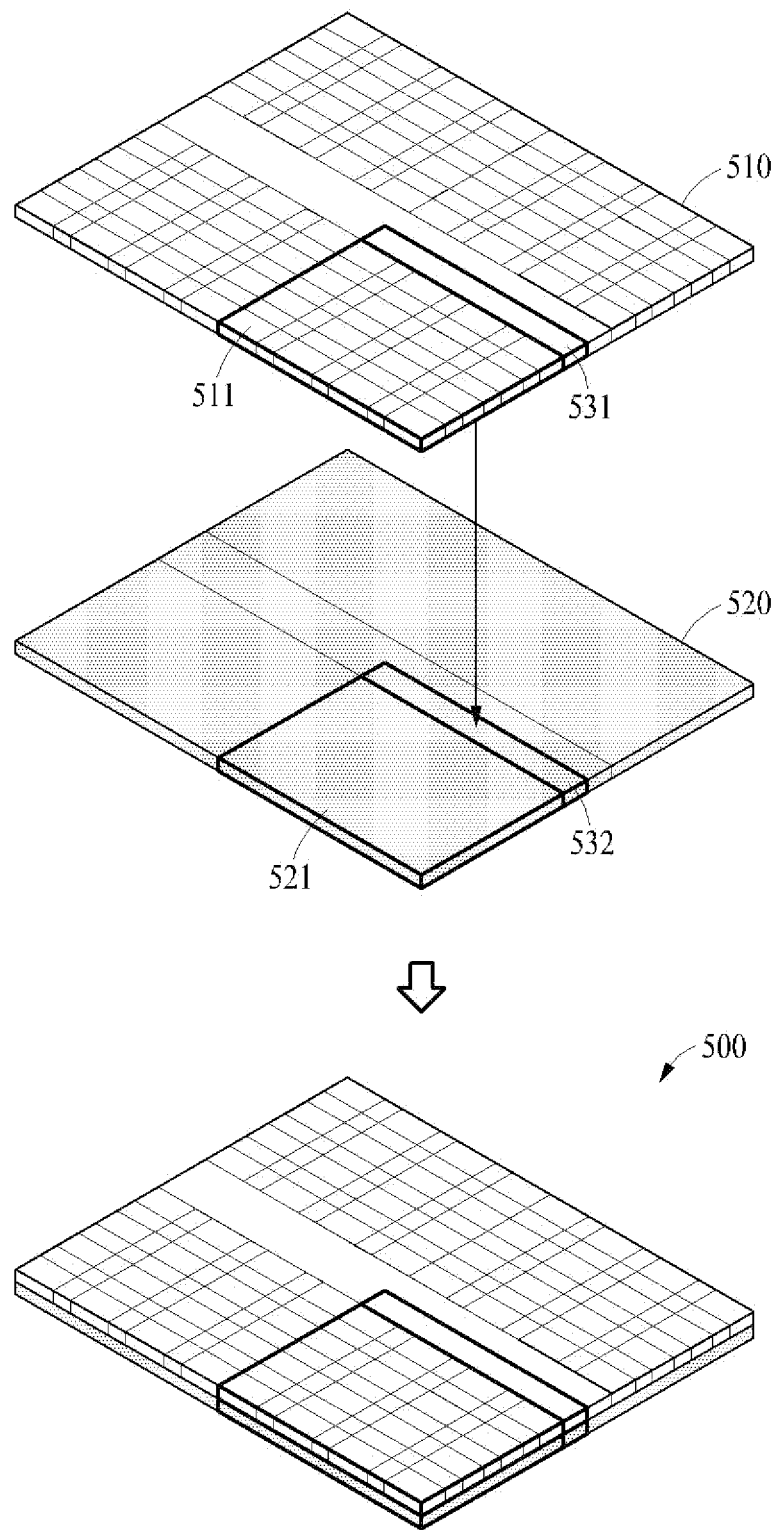
FIG. 5 illustrates an example of a spatial relationship between components of a computational memory device, according to one or more embodiments.

FIG. 5 illustrates an example of a spatial relationship between components of a computational memory device, according to one or more embodiments. Referring to FIG. 5, a computational memory device 500 may include, in a stacking structure, a weight memory block 510 and a computational memory block 520. The computational memory device 500 may include a communication interface in a stacking direction (i.e., between constituent blocks), and the weight memory block 510 and the computational memory block 520 may communicate with each other through the communication interface. The stacking direction is a direction perpendicular to planes formed by the weight memory block 510 and the computational memory block 520.

The weight memory block 510 may include memory areas. A memory area may be classified into a memory bank, a bank group, a memory macro, and the like. Hereinafter, the memory area may be referred to as a memory bank, however, instead of the memory bank, a bank of another level may be used. The weight memory block 510 may include a communication area for at least some memory banks. The computational memory block 520 may include operation areas, and such an operation area may be classified into a bit cell array, an operator, and the like. The computational memory block 520 may include a communication area for at least some operation areas. A communication interface may be implemented in the communication areas of the weight memory block 510 and the computational memory block 520, respectively. For example, the communication interface may connect at least some of the communication areas to one another. For example, weight data of a memory area 511 may be transmitted to an operation area 521 through a communication interface connecting communication areas 531 and 532 to each other.

The weight memory block 510 may include memory banks for storing weight data of a neural network model. The weight memory block 510 may provide at least some of the weight data from memory banks in response to a weight request. The weight request may be transmitted or triggered by the computational memory block 520 and/or a processor. The processor may be a main processor for generally controlling the execution of the neural network model being implemented by the computational memory device 500.

The computational memory block 520 may perform a MAC operation between at least some of the weight data and at least some of input feature data by using a bit cell array including bit cells. A bit cell may be based on various memory cells. In an example, the bit cell may be a memory cell of SRAM. In this case, the bit cell array may digitally perform a MAC operation by using SRAM bit cells. The communication interface may perform communication between the weight memory block 510 and the computational memory block 520.

An operation method of the computational memory device 500 may include an input-stationary method and a weight-stationary method based on which data is to be first stored in the computational memory block 520 ("input" referring to being input to a corresponding neural network layer, e.g., feature data).

In an input-stationary method, an operation result may be derived by iteratively inputting weight data to the computational memory block 520 when input feature data has been stored in the computational memory block 520 (and remains there for at least some iterations of inputted weight data). The computational memory block 520 may perform a MAC operation for a given portion of input feature data through each layer of the neural network model and determine a MAC operation result. For example, the computational memory block 520 may receive first input feature data being applied to a first layer from a data memory and may store the first input feature data in a bit cell array to process the first layer of the neural network model. The computation memory block 520 may then transmit a first weight request to the weight memory block 510 for a MAC operation, where the first weight request indicates/includes first weight data forming an operation pair with the first input feature data, and perform a first MAC operation between the first input feature data and the first weight data by receiving the first weight data from the weight memory block 510. An operation result of the first MAC operation may be at least a portion of first output feature data totally outputted by the first layer.

The data memory noted directly above may be a large-capacity storage device, such as a disk storage device (e.g., an HDD), a flash memory, a DRAM, or the like. Loading data from the data memory to the computational memory block 520 may use more resources (e.g., hardware, power, and time) than would loading the same data from the weight memory block 510 to the computational memory block 520. when an inference operation of the neural network model is performed, a corresponding MAC operation may be performed based on a predetermined rule. A data pair which is to be a target of the MAC operation (based on the predetermined rule) may be referred to as an operation pair. For example, $I_m$ and $W_{t,m}$ of Equation 1 may form an operation pair, and input feature data and weight data, which are to be an operation target determined by a sliding window for a convolution operation, may form an operation pair. When the input feature data and the weight data are expressed in multiple bits (usually the case), a data pair of a corresponding bit position may form an operation pair.

In a weight-stationary method (discussed above), an operation result may be derived by initially providing input data (e.g., feature data) to the computational memory block 520 when/after weight data has been stored in (and remains in) the computational memory block 520. For example, the computational memory block 520 may (i) transmit, to the weight memory block 510, the first weight request indicating the first weight data of the first layer (in order to process the first layer of the neural network model), (ii) receive the first weight data from the weight memory block 510, (iii) store the first weight data in a bit cell array, (iv) receive, from an additional memory, the first input feature data forming an operation pair with the first weight data for a MAC operation, and (v) perform the first MAC operation between the first input feature data and the first weight data. An operation result of the first MAC operation may correspond to at least a portion of first output feature data, which is the output feature data generated by the first layer.

The additional memory may be SRAM. The additional memory may be closer to the computational memory block 520 than to the data memory, as exchanges therebetween may be more frequent. Loading data from the additional memory to the computational memory block 520 may be less expensive than loading the data from the data memory (main memory) to the computational memory block 520. The additional memory may be close to the computational memory block 520 such that loading data from the additional memory to the computational memory block 520 has an expense comparable to loading data from the weight memory block 510 to the computational memory block 520. In some embodiments, the additional memory may be included in some of the stacking structure.

Figure 6:
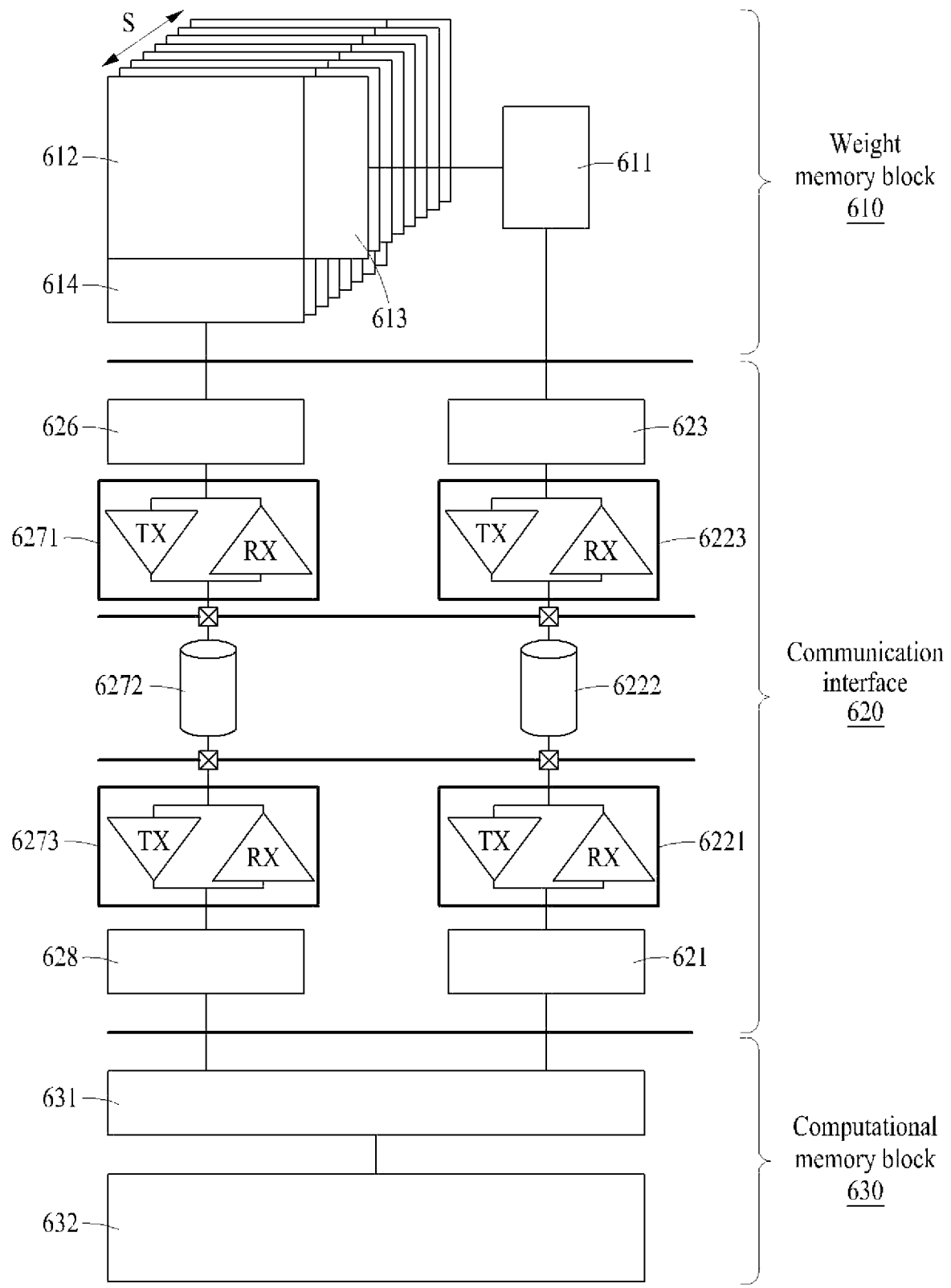
FIG. 6 illustrates an example of an inner structure of a computational memory device, according to one or more embodiments.

FIG. 6 illustrates an example of an inner structure of a computational memory device, according to one or more embodiments. Referring to FIG. 6, a computational memory block 630 may include an access controller 631 and an operation block 632. The access controller 631 may perform a control operation for a storing function and/or an operation/computation function of the operation block 632. For example, the access controller 631 may transmit an instruction (e.g., a weight request) for obtaining data needed for the operation block 632 or it may allocate data transmitted to the operation block 632 to an appropriate address of the operation block 632. The computational memory block 630 may include a path for transmitting an instruction and a path for receiving data. Although the access controller 631 is illustrated in FIG. 6 as connected to both paths, the access controller 631 may be connected to either one of the two paths.

A communication interface 620 may include buffers 621 and 623 for temporarily storing instructions, buffers 626 and 628 for storing weight data, and communication elements 6221, 6222, 6223, 6271, 6272, and 6273 for performing communication between a weight memory block 610 and the computational memory block 630. The buffers 621 and 628 and the communication elements 6221 and 6273 may be in a communication area of the computational memory block 630 and the buffers 623 and 626, and the communication elements 6223 and 6271 may be in a communication area of the weight memory block 610. The communication elements 6222 and 6272 may be implemented as a communication line such as a TSV, for example.

The buffers 621 and 623 may store an instruction, such as a weight request, and/or data, such as an address in (or associated with) the instruction. The access controller 631 may transmit, to the weight memory block 610, weight requests indicating weight data required for a current operation process in an input-stationary method and a current storing process in a weight-stationary method, and the weight requests may be temporarily stored in the buffers 621 and 623 in a transmission process. Each weight request may include an address of correspondingly required weight data. Although FIG. 6 illustrates the buffer 621 on a side of the computational memory block 630 and the buffer 623 on a side of the weight memory block 610, either one of the buffers 621 and 623 may be excluded.

The buffers 626 and 628 may store weight data. The weight memory block 610 may transmit weight data, based on a weight request, to the computational memory block 630, and the weight data may be temporarily stored in the buffers 626 and 628 in a transmission process. Although FIG. 6 illustrates the buffer 626 on a side of the weight memory block 610 and the buffer 628 on a side of the computational memory block 630, either one of the buffers 626 and 628 may be excluded.

The weight memory block 610 may include an access controller 611. The access controller 611 may receive a weight request from the access controller 631 and access at least some of memory banks corresponding to a memory address of the weight request. The at least some of the memory banks may transmit weight data, based on the weight request, to the computational memory block 630 through the communication interface 620.

The weight memory block 610 may include memory banks, such as a memory bank 612, row decoders, such as a row decoder 613, and column decoders, such as a column decoder 614. The memory banks, the row decoders, and the column decoders of FIG. 6 may be expressed by dividing, by each memory bank, and stacking the weight memory block 200 of FIG. 2. In the examples in FIGS. 2, 3, and 4, when the weight memory block 200 has a capacity of 16 MB and each memory bank 612 has a capacity of 1 MB, S may be 16 (S is shown in FIG. 6, is the number of memory banks 612), and when the weight memory block 200 has a capacity of 16 MB and the memory bank 612 has a capacity of 0.25 MB, S may be 64.

Figure 7:
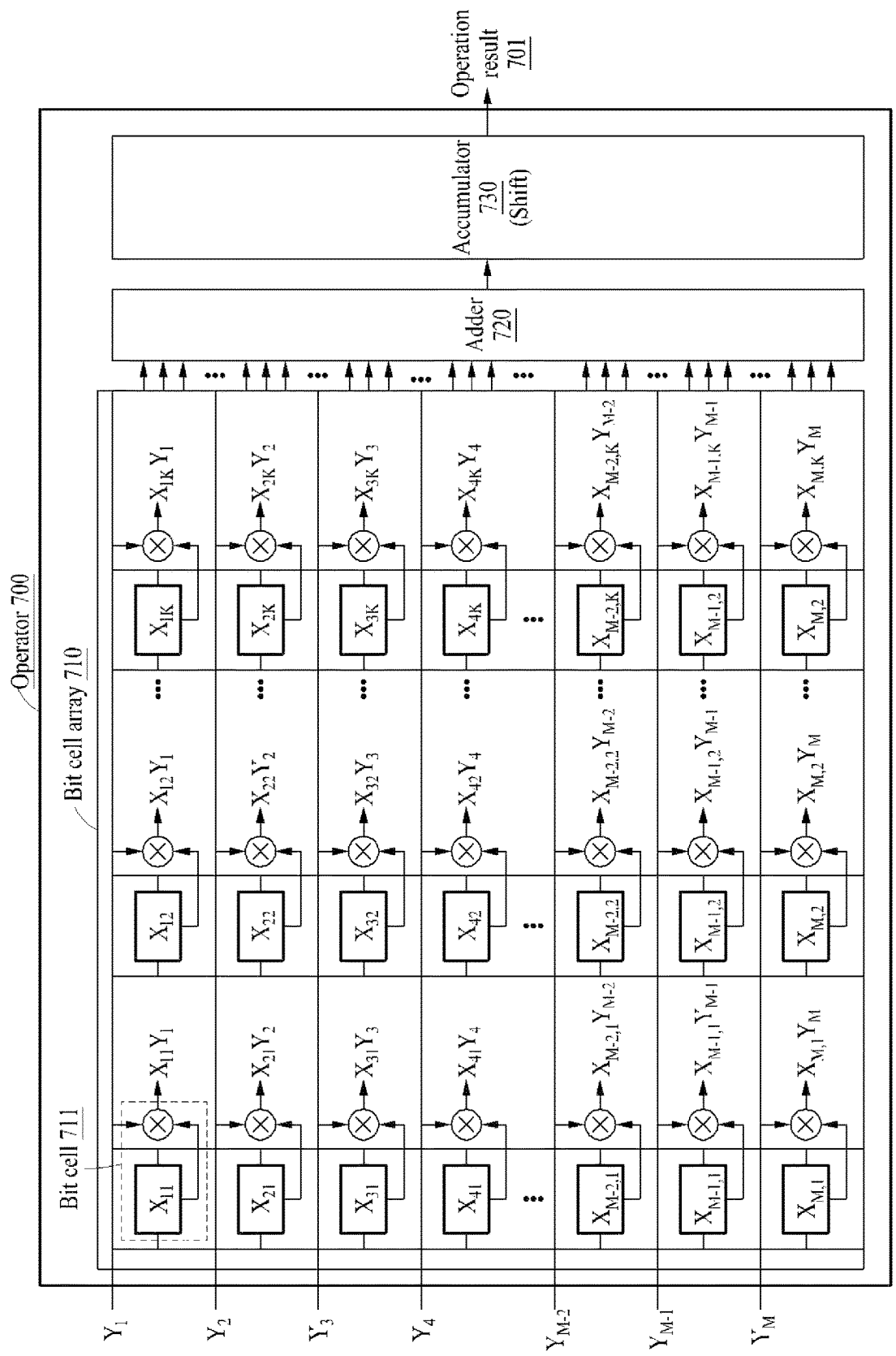
FIG. 7 illustrates an example of a structure of an operator of a computational memory block, according to one or more embodiments.

FIG. 7 illustrates an example structure of an operator of a computational memory block, according to one or more embodiments. Referring to FIG. 7, an operator 700 may include a bit cell array 710, an adder 720, and an accumulator 730, in which the bit cell array 710 includes bit cells, such as a bit cell 711, the adder 720 performs an addition operation based on a multiplication result of a multiplication operation of the bit cells, and the accumulator 730 performs an accumulate operation based on an addition result of the addition operation of the adder 720. An output of the accumulator 730 may correspond to an operation result 701 of a MAC operation. Each bit cell may perform a multiplication operation of bit pairs based on at least some of weight data and at least some of input feature data. The adder 720 may correspond to an adder tree. The accumulator 730 may include a shift circuit for performing a shift for changing a bit position, thus providing accumulation with a prior result (if any) and the current result from the adder 720.

The bit cell array 710 may perform a bitwise multiplication operation between input data $Y_m$ and cell data $X_{mk}$. In this case, m may be an integer greater than or equal to 1 and less than or equal to M, k may be an integer greater than or equal to 1 and less than or equal to K, and M and K may be an integer. The cell data $X_{mk}$ may refer to data stored in each bit cell. The cell data $X_{mk}$ may be stored in the bit cell array 710 prior to an operation of the operator 700. When the input data $Y_m$ is input after the cell data $X_{mk}$ is stored in the bit cell array 710, a multiplication operation result may be output.

Performance of the multiplication operation may vary depending on the memory type of the bit cells. For example, when each bit cell corresponds to 6T-SRAM, the cell data $X_{mk}$ may be stored by inverters of each bit cell, the input data $Y_m$ may be input through a word line, and output data $X_{mk} Y_m$ may be output through a bit line. In this case, for multiplication, a circuit element such as a transistor or an inverter may be added to each bit cell.

When the input data $Y_m$ has a multi-bit data format (as will usually be the case), an operation may be performed by sequentially inputting (streaming), bit by bit, to the bit cell array 710, a bitstream corresponding to the input data $Y_m$. For example, the input data $Y_m$ corresponding to a first bit position (e.g., a least significant bit (LSB)) in a first stage may be input to the bit cell array 710, and the output data $X_{mk} Y_m$ corresponding to the first bit position may be output from the bit cell array 710. The adder 720 may perform addition operations based on the output data $X_{mk} Y_m$ and the accumulator 730 may accumulate addition results.

An addition result that is based on (computed from) the input data $Y_m$ corresponding to the first bit position may be referred to as a first addition result. The accumulator 730 may increase (shift) a bit position of an addition result through a shift operation. Such a shift is not required for the first bit position and the corresponding first addition result. After the input data $Y_m$ corresponding to a second bit position in a second stage is input to the bit cell array 710, an addition result corresponding to the second bit position may be determined. The addition result, based on the input data $Y_m$, corresponding to the second bit position may be referred to as a second addition result. The second bit position is greater than the first bit position by one bit position (and is the more-significant bit), and a bit position of the second addition result may increase by one bit position through one shift operation for the second addition result. The accumulator 730 may accumulate the first addition result and the second addition result after changing a bit position of the second addition result. Such an operation process may be iterated up to the last bit position (e.g., a most significant bit (MSB)) of the input data $Y_m$.

When the cell data $X_{mk}$ has a multi-bit data format, a final operation result may be derived by shifting and accumulating operation results after storing the cell data $X_{mk}$ of different bit positions in different bit cell arrays. In an input-stationary method, the cell data $X_{mk}$ may be input feature data and the input data $Y_m$ may be weight data. In a weight-stationary method, the cell data $X_{mk}$ may be weight data and the input data $Y_m$ may be input feature data.

Figure 9:
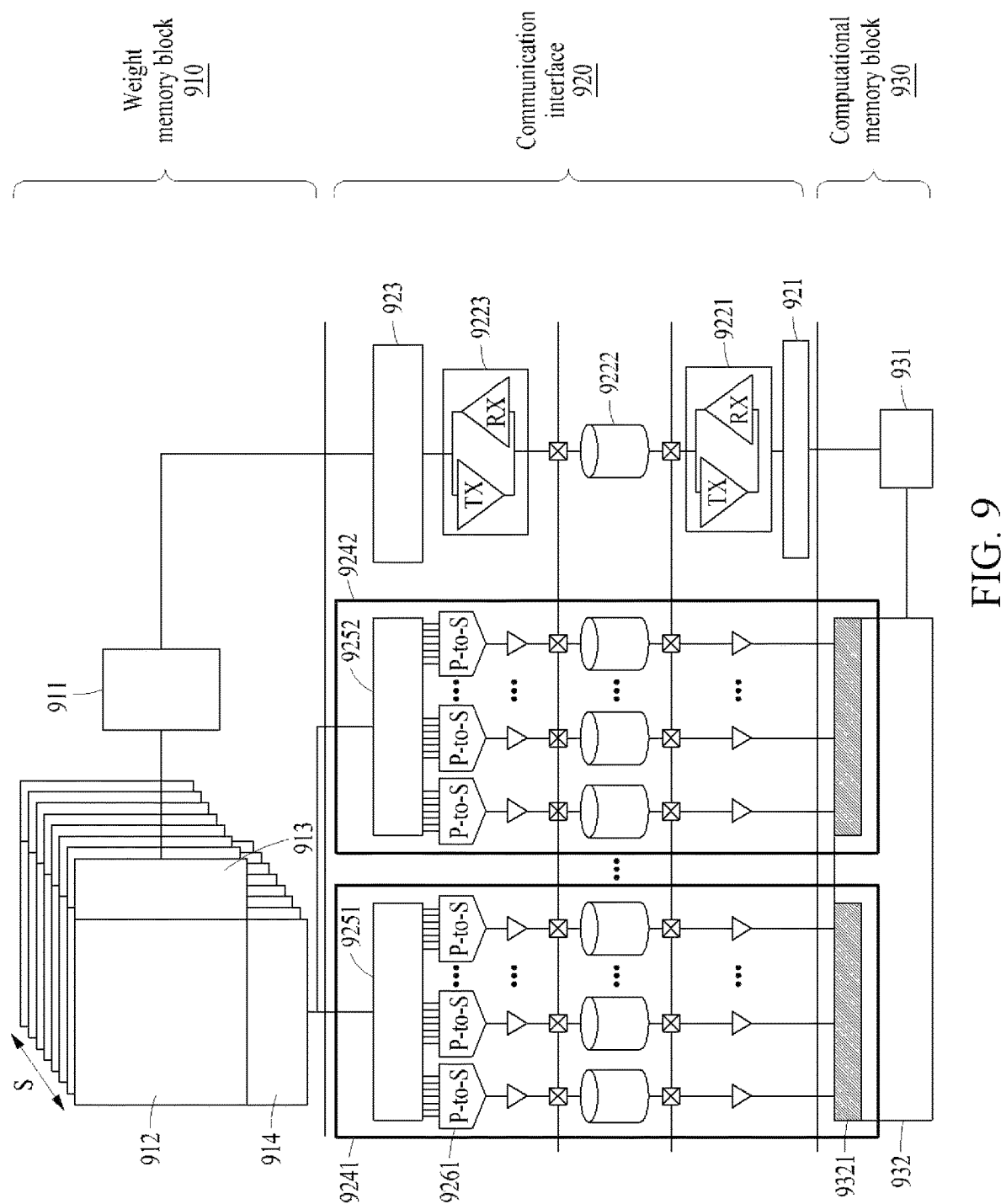
FIG. 9 illustrates an example of an inner structure of a computational memory device in an input-stationary method, according to one or more embodiments.
Figure 10:
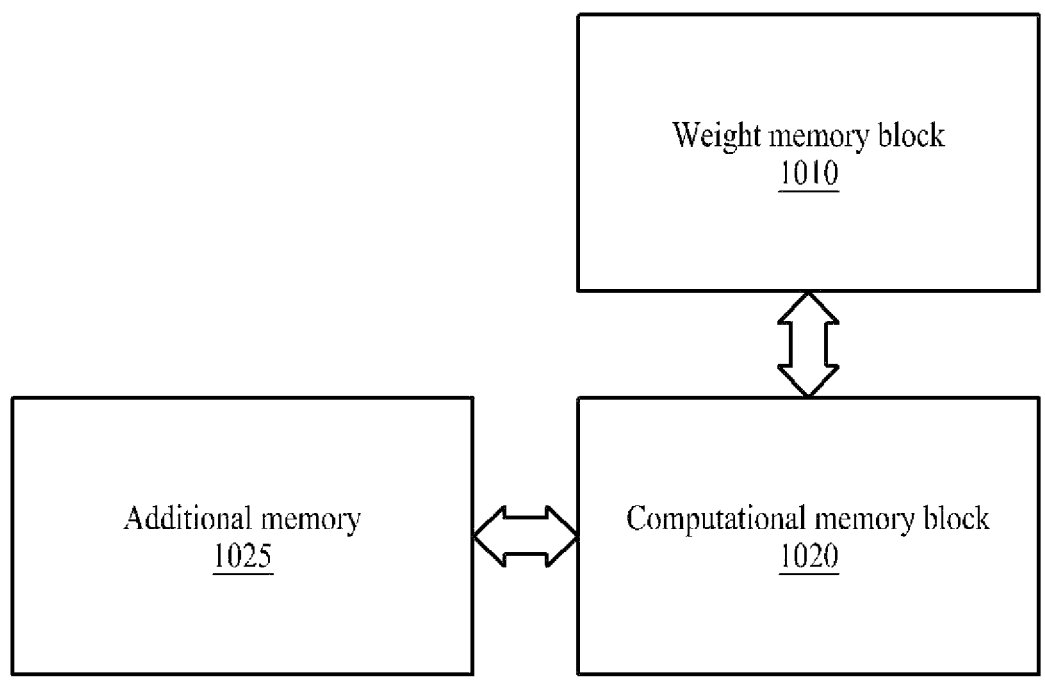
FIG. 10 illustrates an example of a structure of a computational memory device in a weight-stationary method, according to one or more embodiments.
Figure 11:
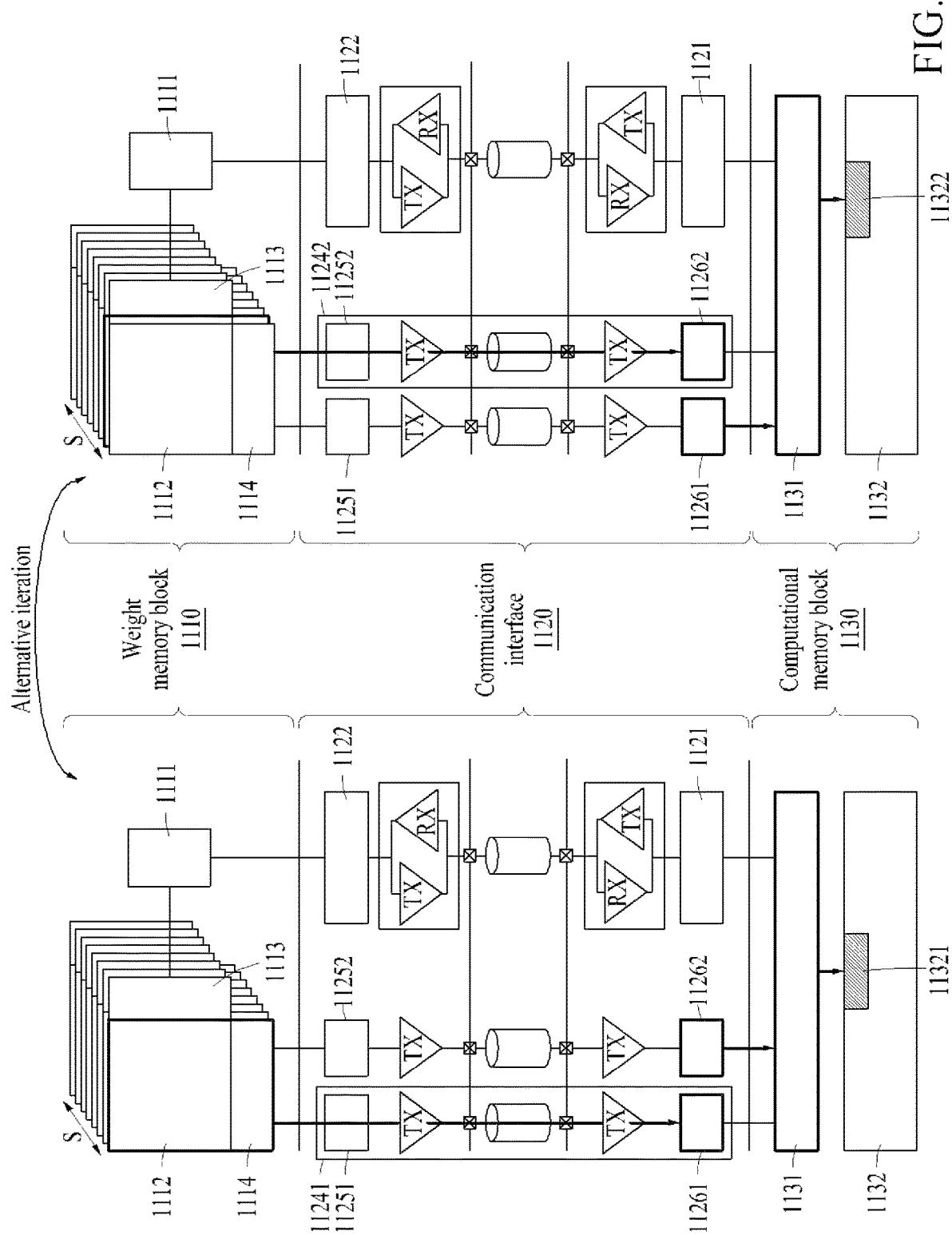
FIG. 11 illustrates an example of an inner structure of a computational memory device in a weight-stationary method, according to one or more embodiments.
Figure 12:
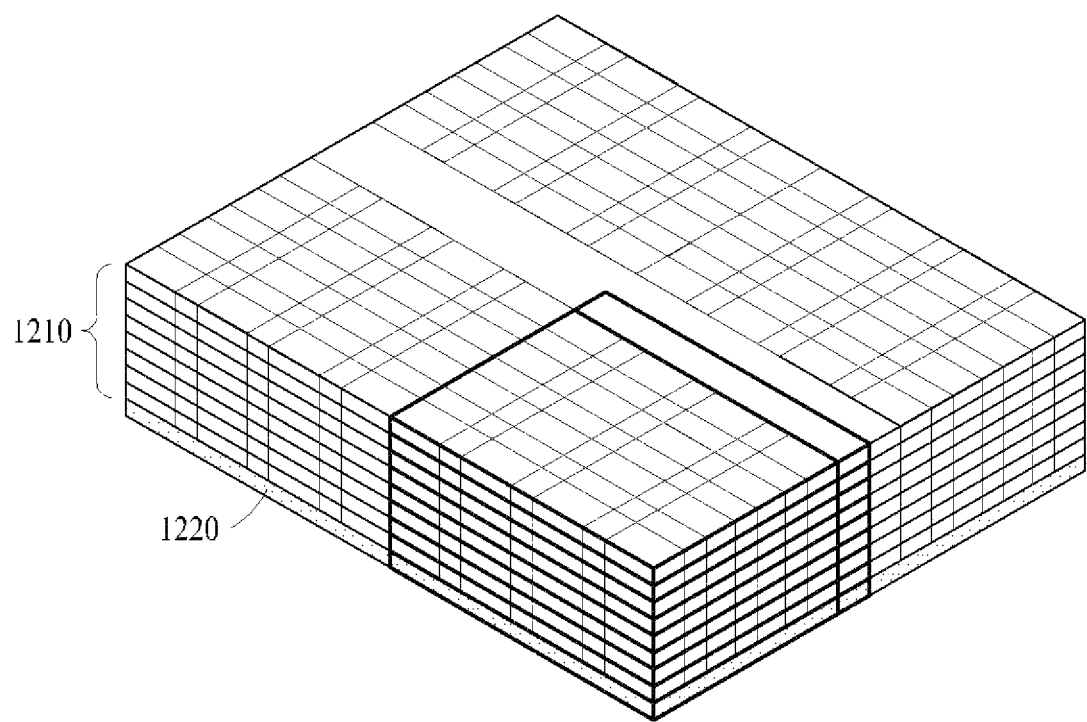
FIG. 12 illustrates an example of a stacking structure of a computational memory device including weight memory layers, according to one or more embodiments.

FIG. 9 together with FIG. 10, and FIG. 11 together with FIG. 12, show different operations and details of a same computational memory device, which may operate in either an input-stationary mode/method (FIGS. 9 and 10) or in a weight-stationary mode/method (FIGS. 10 and 11). In some embodiments, the computation memory device is configured to only operate in one mode/method or the other (e.g., in some implementations, a weight-stationary mode/method and an additional memory may be omitted).

Figure 8:
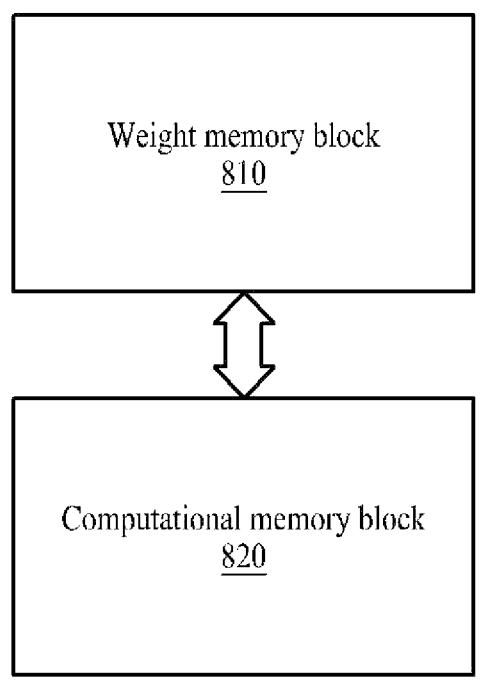
FIG. 8 illustrates an example of a structure of a computational memory device in an input-stationary method, according to one or more embodiments.

FIG. 8 illustrates an example of a structure of a computational memory device in an input-stationary method, according to one or more embodiments. Referring to FIG. 8, a weight memory block 810 may store weight data. A computational memory block 820 may first store input feature data and perform a MAC operation between the input feature data and weight data while receiving the weight data from the weight memory block 810. A data memory (e.g., a main/host memory) may provide input feature data. When the input feature data has a multi-bit data format, the input feature data of different bit positions may be stored in different operation areas (e.g., a bit cell array and an operator) of the computational memory block 820. A weight request may be generated based on such a rule. The computational memory block 820 may transmit a weight request to the weight memory block 810 and the weight memory block 810 may transmit weight data based on the weight request. The weight data may be transformed to a bit serial transmission, and the computational memory block 820 may thus derive a MAC operation result through a bitwise multiplication operation. In other words, as the bits of the input feature data are processed, different portions of the weight data may correspondingly be requested by the computational memory block 820 (i.e., whichever weight data currently matches with the current arrangement of the input feature data).

FIG. 9 illustrates example inner structure of a computational memory device in an input-stationary method, according to one or more embodiments. Referring to FIG. 9, a computational memory block 930 may include an access controller 931, an operation block 932, and a communication interface 920. The communication interface 920 may include buffers 921 and 923 for temporarily storing instructions, buffers 9251 and 9252 for temporarily storing weight data, and communication elements 9221, 9222, and 9223 for physically exchanging data between the buffers 921 and 923. A weight memory block 910 may include memory banks, such as an access controller 911 and a memory bank 912, row decoders, such as a row decoder 913, and column decoders, such as a column decoder 914.

Weight data may have a multi-bit data format. The computational memory block 930 may perform a bitwise MAC operation by sequentially receiving, bit by bit, a bitstream corresponding to at least some of weight data. A transmission path of the weight memory block 910 may include channels 9241 and 9242. Weight data of each such channel may be transformed to a bit serial in a transmission process. The communication interface 920 may include parallel-to-serial converters, such as a parallel-to-serial converter 9261. The parallel-to-serial converter 9261 may convert an expression format of each weight value of weight data from a parallel expression to a serial expression.

The operation block 932 may include operation areas, such as an operation area 9321, and a bit serial of different channels of channels 9241 and 9242 may be transmitted to different operation areas of operation areas. Different operation areas may store different input feature values of the same bit position or different bit positions of the same input feature value. The number of channels of the communication interface 920 may be the same as the number of operation areas of the operation block 932. The number of sub-channels of each channel may be the same as the number (e.g., M of FIG. 7) of input paths of input data (e.g., the input data $Y_m$ of FIG. 7) of a bit cell array. Each channel may include parallel-to-serial converters (the same number as the number of sub-channels). The description provided with reference to FIG. 6 is applicable to the example of FIG. 9.

FIG. 10 illustrates example structure of a computational memory device in a weight-stationary method, according to one or more embodiments. Referring to FIG. 10, a weight memory block 1010 may store weight data and an additional memory 1025 may store input feature data. A data memory may provide input feature data. A computational memory block 1020 may first store weight data and perform a MAC operation between input feature data and the weight data while receiving the input feature data from the additional memory 1025. When the weight data has a multi-bit data format, the weight data of different bit positions may be stored in different operation areas (e.g., a bit cell array and an operator) of the computational memory block 1020. Based on such a rule, the input feature data may be provided from the additional memory 1025 to the computational memory block 1020. The input feature data may have a multi-bit data format. The computational memory block 1020 may perform a bitwise MAC operation by sequentially receiving, bit by bit, a bitstream corresponding to the input feature data. The description of the bit serial in the input-stationary method may apply to a process of processing a bit serial of the computational memory block 1020 and the additional memory 1025.

FIG. 11 illustrates an example of an inner structure of a computational memory device in a weight-stationary method, according to one or more embodiments. Referring to FIG. 11, a computational memory block 1130 may include an access controller 1131, an operation block 1132, and a communication interface 1120. The communication interface 1120 may include buffers 1121 and 1122 for buffering instructions and buffers 11251, 11252, 11261, and 11262 for buffering weight data. A weight memory block 1110 may include memory banks and an access controller 1111 controlling access to the same. Each memory bank 1112 may include a row decoder (such as a row decoder 1113) and a column decoder (such as a column decoder 1114).

The communication interface 1120 may include first and second channels 11241 and 11242, and a pipeline technique may be applied to a process of storing weight data in the computational memory block 1130 through first and second channels 11241 and 11242. Three or more such channels may be used.

After first weight data of the weight memory block 1110 is stored in the buffer 11261 of the first channel 11241 through the first channel 11241, while the first weight data is transmitted from the buffer 11261 to the computational memory block 1130, second weight data of the weight memory block 1110 may be stored in the buffer 11262 of the second channel 11242 through the second channel 11242. Then, while the second weight data is transmitted from the buffer 11262 to the computational memory block 1130, third weight data of the weight memory block 1110 may be stored in the buffer 11261 of the first channel 11241 through the first channel 11241. These operations may be alternately iterated. In addition, the description provided with reference to FIG. 6 is applicable to the example of FIG. 11.

FIG. 12 illustrates an example of a stacking structure of a computational memory device including weight memory layers, according to one or more embodiments. Referring to FIG. 12, weight memory layers 1210 (a weight memory block) may be stacked on a computational memory block 1220. weight memory layers 1210 may store a large-scale neural network model. For example, each weight memory layer of weight memory layers 1210 may store weight data of respective layers of the large-scale neural network model. As described next with reference to FIG. 13, in this case, a communication interface for providing communication through the same vertical direction of the computation memory device may be provided. For example, the communication interface may correspond to a TSV. Alternatively, wire lines sharing the same medium may be used as the communication interface.

Figure 13:
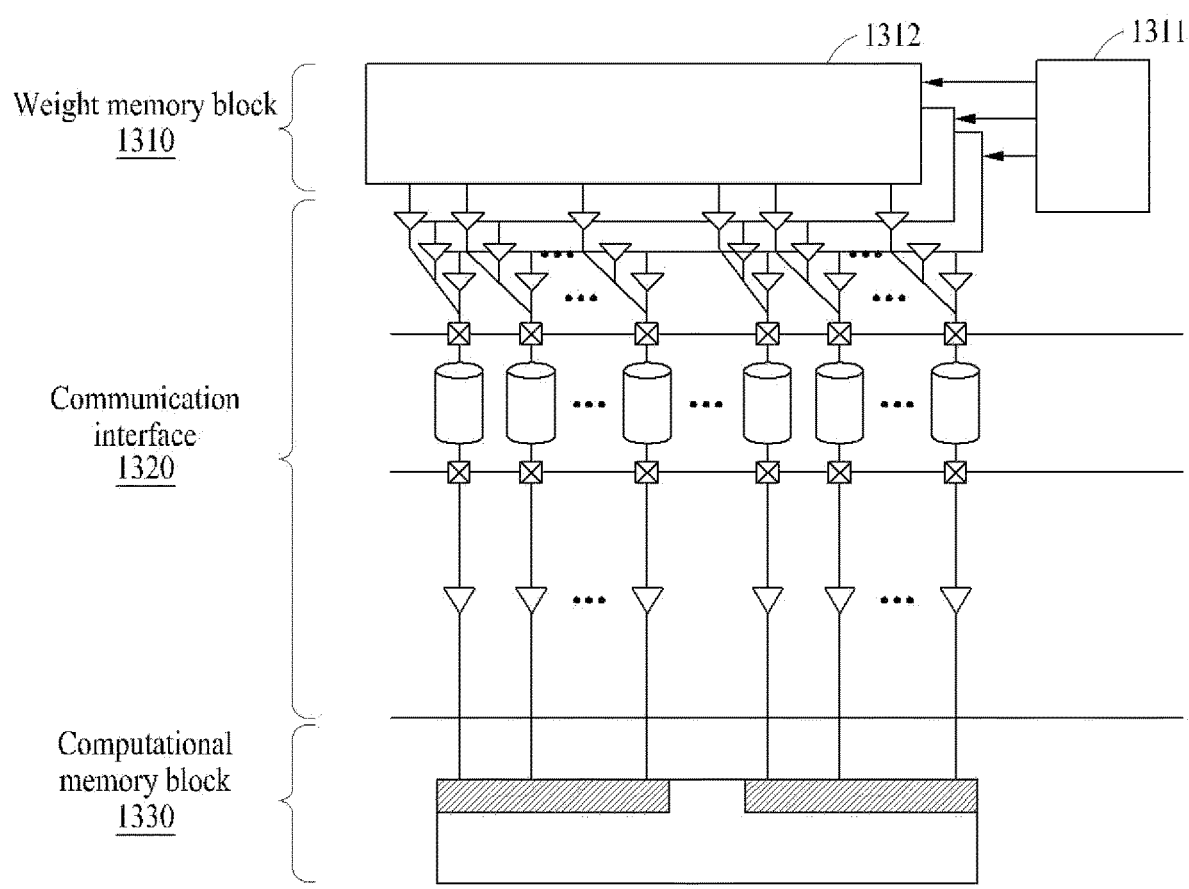
FIG. 13 illustrates an example of an inner structure of a computational memory device including weight memory layers, according to one or more embodiments.

FIG. 13 illustrates an example of an inner structure of a computational memory device including weight memory layers, according to one or more embodiments. Referring to FIG. 13, a weight memory block 1310 may include weight memory layers, such as a weight memory layer 1312, and an access controller 1311. The access controller 1311 may correspond to a multi-access controller for parallelly controlling weight memory layers. A communication interface 1320 may provide an increased number of channels and/or an increased bandwidth as the number of weight memory layers increases. Accordingly, input data may be provided to a computational memory block 1330 in an increased speed and an operation speed may increase. To summarize, in some embodiments, each weight memory layer of the weight memory block 1310 may have independent access to the communication interface 1320 and may thus, at times, independently communicate with the computational memory block 1330 through the communication interface 1320 (in some implementations, more than one communication interface may be provided).

Figure 14:
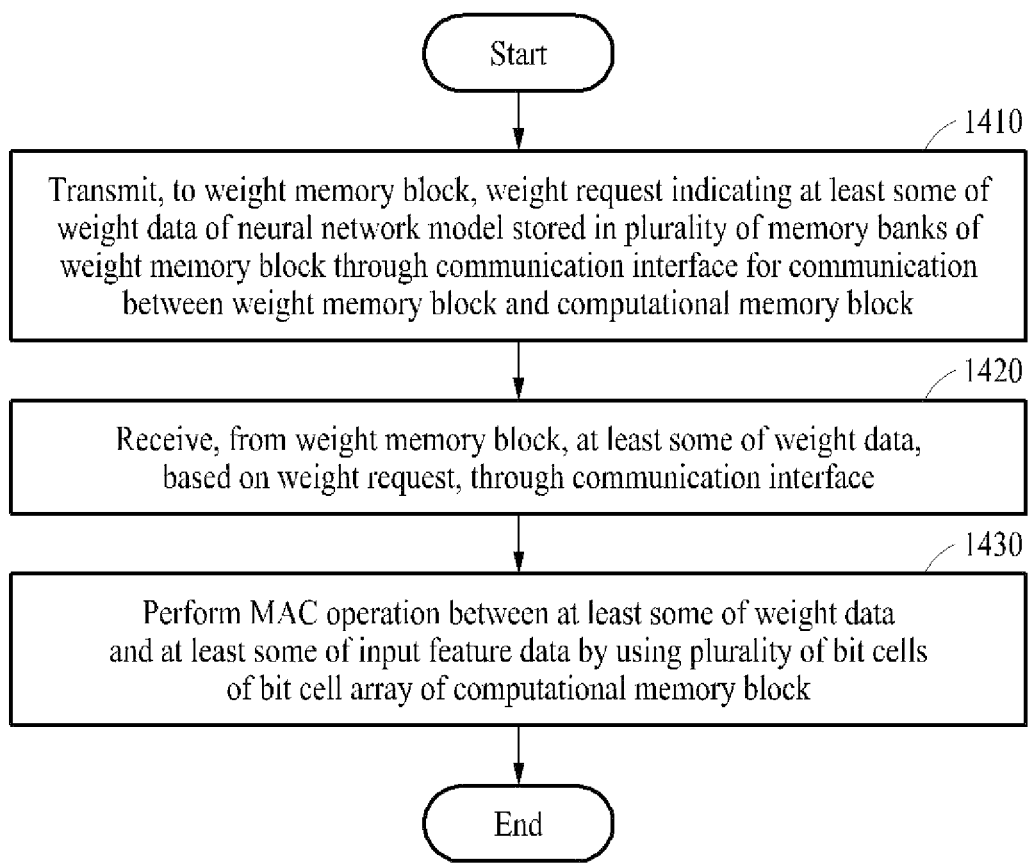
FIG. 14 illustrates an example of a multiply-accumulate (MAC) operation method of a computational memory device, according to one or more embodiments.

FIG. 14 illustrates an example of a MAC operation method of a computational memory device, according to one or more embodiments. Referring to FIG. 14, in operation 1410, a weight request may be transmitted to a weight memory block through a communication interface for communication between the weight memory block and a computational memory block. The weight request may indicate at least some of weight data of a neural network model stored in memory banks of the weight memory block. In operation 1420, at least some of the weight data indicated by the weight request may be received from the weight memory block through the communication interface. In operation 1430, a MAC operation may be performed between at least some of the weight data and at least some of input feature data by using bit cells of a bit cell array of the computational memory block. Operations 1410, 1420, and 1430 and/or additional operations below may be performed by a computational memory device (e.g., a processor of the computational memory device, the computational memory block, and/or an access controller of the computational memory block, as the case may be).

A MAC operation method may further include an operation of receiving first input feature data of a first layer of the neural network model from a data memory and storing the first input feature data in a bit cell array.

Operation 1410 may include an operation of transmitting, to the weight memory block, a first weight request indicating first weight data forming an operation pair with the first input feature data for a MAC operation. Operation 1430 may include an operation of performing a first MAC operation between the first input feature data and the first weight data. An operation result of the first MAC operation may correspond to at least some of the entirety of first output feature data generated by the entire first layer.

The weight data may have a multi-bit data format, and the computational memory block may perform a bitwise MAC operation by sequentially receiving, bit by bit, a bitstream corresponding to at least some of the weight data.

Operation 1410 may include an operation of transmitting, to the weight memory block, the first weight request indicating the first weight data of the first layer of the neural network model. The MAC operation method may further include an operation of receiving the first weight data from the weight memory block and storing the first weight data in a bit cell array. Operation 1430 may include an operation of receiving, from an additional memory, the first input feature data forming an operation pair with the first weight data for a MAC operation and performing the first MAC operation between the first input feature data and the first weight data. An operation result of the first MAC operation may correspond to at least some of the first output feature data generated by the first layer.

The communication interface may include a first channel and a second channel. After the first weight data of the weight memory block is stored in a first data buffer of the first channel through the first channel, while the first weight data is transmitted from the first data buffer to the computational memory block, second weight data of the weight memory block may be stored in a second data buffer of the second channel through the second channel.

In addition, the descriptions provided with reference to FIGS. 1 to 13 and 15 may apply to the MAC operation method of FIG. 14.

Figure 15:
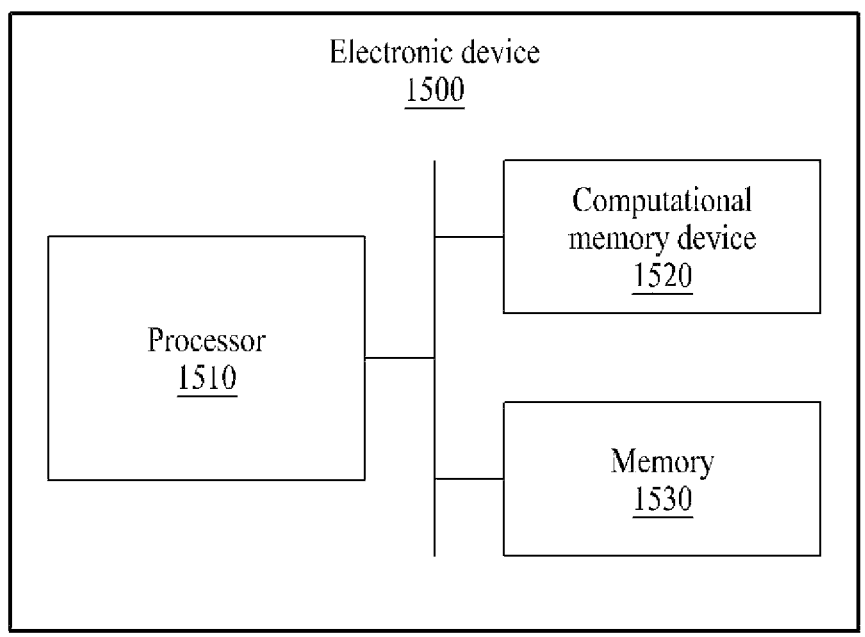
FIG. 15 illustrates an example of a structure of an electronic device, according to one or more embodiments.

FIG. 15 illustrates an example of a structure of an electronic device, according to one or more embodiments. Referring to FIG. 15, an electronic device 1500 may include a processor 1510, a computational memory device 1520, and a memory 1530. The memory 1530 may be connected to the processor 1510 and the computational memory device 1520 and may store instructions executable by the processor 1510, data to be processed by the processor 1510, or data processed by the processor 1510. The memory 1530 may include a non-transitory computer-readable medium (e.g., high-speed RAM) and/or a non-volatile computer-readable storage medium (e.g., one or more disk storage devices, flash memory devices, and other non-volatile solid-state memory devices). The memory 1530 may be referred to as a data memory or main memory.

The computational memory device 1520 may include memory banks for storing weight data of a neural network model, a weight memory block for providing at least some of the weight data from memory banks in response to a weight request, a computational memory block stacked on the weight memory block in a perpendicular direction and for performing a MAC operation between at least some of the weight data and at least some of input feature data by using a bit cell array including bit cells, and a communication interface for performing communication between the weight memory block and the computational memory block.

The computational memory block, to process a first layer of the neural network model ("first" referring to any arbitrary layer), may receive first input feature data of the first layer from a data memory and store the first input feature data in the bit cell array, transmit, to the weight memory block, a first weight request indicating first weight data forming an operation pair with the first input feature data for a MAC operation, and receive the first weight data from the weight memory block and perform a first MAC operation between the first input feature data and the first weight data. An operation result of the first MAC operation may correspond to at least some of first output feature data of the first layer.

The weight data may have a multi-bit data format, and the computational memory block may perform a bitwise MAC operation by sequentially receiving, bit by bit, a bitstream corresponding to at least some of the weight data.

The communication interface may include a parallel-to-serial converter for converting an expression format of each weight value of the weight data from a parallel expression to a serial expression.

The computational memory block, to process the first layer of the neural network model, may transmit, to the weight memory block, the first weight request indicating the first weight data of the first layer, receive the first weight data from the weight memory block and store the first weight data in the bit cell array, and receive the first input feature data, which with the first weight data, forms an operation pair for a MAC operation. The computational memory block may perform the first MAC operation on the operation pair, in this case, between the first input feature data and the first weight data. An operation result of the first MAC operation may correspond to at least some of the first output feature data generated by the first layer.

The first input feature data may have a multi-bit data format, and the computational memory block may perform a bitwise first MAC operation by sequentially receiving, bit by bit, a bitstream corresponding to the first input feature data.

The communication interface may include a first channel and a second channel. After the first weight data of the weight memory block is stored in a first data buffer of the first channel through the first channel, while the first weight data is transmitted from the first data buffer to the computational memory block, second weight data of the weight memory block may be stored in a second data buffer of the second channel through the second channel.

The weight request may include a memory address of at least some of the weight data.

The computational memory block may include a first access controller for transmitting the weight request to the weight memory block and the weight memory block may include a second access controller for receiving the weight request from the first access controller and accessing at least some of memory banks corresponding to the memory address of the weight request.

The weight memory block may include bank groups of memory banks and an address decoder of bank groups.

Each memory bank of memory banks may include sub-memory banks and a sub-address decoder of sub-memory banks.

The communication interface may include a TSV connecting the weight memory block to the computational memory block in a perpendicular direction.

memory banks may correspond to non-volatile memory, and the bit cell array may digitally perform a MAC operation.

The computational memory block may include a bit cell array, an adder, and an accumulator, in which the bit cell array includes a plurality bit cells for performing multiplication operations between bit pairs based on at least some of the weight data and at least some of the input feature data, the adder performs addition operations based on multiplication results based on the multiplication operations, and the accumulator performs an accumulate operation based on an addition result of the addition operations. An accumulation result of the accumulate operation may correspond to a MAC operation result of the MAC operation.

The communication interface may include a first buffer for temporarily storing weight requests including the weight request, a second buffer for temporarily storing at least some of the weight data based on the weight request, and a communication element for performing communication between the weight memory block and the computational memory block.

In addition, the descriptions provided with reference to FIGS. 1 to 14 may apply to the electronic device 1500.

The computing apparatuses, the electronic devices, the processors, the memories, the image sensors, the displays, the information output system and hardware, the storage devices, and other apparatuses, devices, units, modules, and components described herein with respect to FIGS. 1-15 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-15 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A computational memory device comprising:
   memory banks configured to store weight data of a neural network model and a weight memory block configured to provide at least some of the weight data from memory banks in response to a weight request;
   a computational in-memory computing (IMC) memory block physically stacked on or under the weight memory block such that faces of the respective blocks face each other, the computational IMC memory block configured to perform a multiply-accumulate (MAC) operation between the at least some of the weight data and at least some of input data by using a bit cell array comprising bit cells, wherein each bit cell is configured to, while continuously storing a respective same portion of the weight data, perform multiplication operations between the respective same portion of the weight data continuously stored thereby and different portions of the input data inputted thereto, wherein the multiplication operations of the bit cells are part of the MAC operation; and
   a communication interface configured to perform communication between the weight memory block and the computational IMC memory block.

2. The computational memory device of claim 1, wherein, to process a first layer of the neural network model, the computational IMC memory block is configured to:
   receive first input data of the first layer from a data memory and store the first input data of the first layer in the bit cell array,
   transmit, to the weight memory block, a first weight request indicating first weight data, the weight data forming, with the first input data, an operation pair for the MAC operation, and
   receive the first weight data from the weight memory block and perform a first MAC operation between the first input data and the first weight data, wherein an operation result of the first MAC operation corresponds to at least a portion of first output feature data generated by the first layer.

3. The computational memory device of claim 1, wherein
the weight data comprises a multi-bit data format, and
the computational IMC memory block is configured to sequentially receive, bit by bit, a bitstream corresponding to at least some of the weight data and perform a bitwise MAC operation.

4. The computational memory device of claim 1, wherein the communication interface comprises a parallel-to-serial converter configured to convert an expression format of weights in the weight data from a parallel expression to a serial expression.

5. The computational memory device of claim 1, wherein, to process a first layer of the neural network model, the computational IMC memory block is configured to
transmit, to the weight memory block, a first weight request indicating first weight data of the first layer,
receive the first weight data from the weight memory block and store the first weight data in the bit cell array, and
receive, from an additional memory, first input data forming an operation pair with the first weight data for the MAC operation and perform a first MAC operation between the first input data and the first weight data, wherein
an operation result of the first MAC operation corresponds to at least some of first output feature data of the first layer.

6. The computational memory device of claim 5, wherein
the first input data comprises a multi-bit data format, and
the computational IMC memory block is configured to sequentially receive, bit by bit, a bitstream corresponding to the first input data and perform a bitwise first MAC operation.

7. The computational memory device of claim 1, wherein
the communication interface comprises a first channel and a second channel, and after first weight data of the weight memory block is stored in a first data buffer of the first channel through the first channel, while the first weight data is transmitted to the computational memory block from the first data buffer, second weight data of the weight memory block is stored in a second data buffer of the second channel through the second channel.

8. The computational memory device of claim 1, wherein the weight request comprises a memory address of at least some of the weight data.

9. The computational memory device of claim 8, wherein
the computational IMC memory block comprises a first access controller configured to transmit the weight request to the weight memory block, and
the weight memory block comprises a second access controller configured to receive the weight request from the first access controller and access at least some of memory banks corresponding to the memory address of the weight request.

10. The computational memory device of claim 1, wherein
the weight memory block comprises bank groups of memory banks and an address decoder of bank groups.

11. The computational memory device of claim 10, wherein
each memory bank of memory banks comprises sub-memory banks having respective sub-address decoders.

12. The computational memory device of claim 1, wherein
the communication interface comprises a through silicon via (TSV) connecting the weight memory block to the computational IMC memory block in direction perpendicular to the faces of weight memory block and computational IMC memory block, respectively.

13. The computational memory device of claim 1, wherein memory banks comprise non-volatile memory and the bit cell array comprises volatile memory.

14. The computational memory device of claim 13, wherein
the non-volatile memory comprises magnetic random-access memory (MRAM) and the volatile memory comprises static random-access memory (SRAM).

15. The computational memory device of claim 1, wherein the computational IMC memory block comprises:
the bit cells are configured to perform the multiplication operations between a weight bit of the weight data and an input bit of the input data;
an adder configured to perform addition operations based on multiplication results of the multiplication operations; and
an accumulator configured to perform an accumulate operation based on an addition result of the addition operations, wherein
an accumulation result of the accumulate operation corresponds to a MAC operation result of the MAC operation.

16. The computational memory device of claim 1, wherein the communication interface comprises:
a first buffer configured to temporarily store weight requests comprising the weight request;
a second buffer configured to temporarily store the at least some of the weight data based on the weight request; and
a communication element configured to perform communication between the weight memory block and the computational memory block.

17. A multiply-accumulate (MAC) operation method of a computational IMC memory block physically arranged with a weight memory block so that the blocks form a stack, the MAC operation method comprising:
transmitting a weight request to the weight memory block through a communication interface for communication between the weight memory block and the computational IMC memory block, the weight request indicating at least some of weight data of a neural network model stored in memory banks of the weight memory block;
receiving, through the communication interface, at least some of the weight data based on the weight request from the weight memory block; and
performing a MAC operation between the at least some of the weight data and at least some of input data by using bit cells of a bit cell array of the computational IMC memory block, wherein each bit cell is configured to, while continuously storing a respective same portion of the weight data, perform multiplication operations between the respective same portion of the weight data continuously stored thereby and different portions of the input data inputted thereto, wherein the multiplication operations of the bit cells are part of the MAC operation.

18. The MAC operation method of claim 17, further comprising:

receiving first input data of a first layer of the neural network model from data memory and storing the first input data in the bit cell array, wherein the transmitting the weight request comprises transmitting, to the weight memory block, a first weight request indicating first weight data, the first weight data and the first input data forming an operation pair for the MAC operation, and the performing the MAC operation comprises performing a first MAC operation between the first input data and the first weight data, wherein an operation result of the first MAC operation corresponds to at least some of first output feature data of the first layer.

19. The MAC operation method of claim 17, wherein the weight data comprises a multi-bit data format and the computational IMC memory block is configured to sequentially receive, bit by bit, a bitstream corresponding to at least some of the weight data and perform a bitwise MAC operation.

20. The MAC operation method of claim 17, wherein the transmitting the weight request comprises transmitting, to the weight memory block, a first weight request indicating first weight data of the first layer of the neural network model, the MAC operation method further comprises receiving the first weight data from the weight memory block and storing the first weight data in the bit cell array, and the performing the MAC operation further comprises receiving, from an additional memory, first input data forming an operation pair with the first weight data for the MAC operation and performing a first MAC operation between the first input data and the first weight data, wherein an operation result of the first MAC operation corresponds to at least some of first output feature data of the first layer.

* * * * *